United States Patent
Stefani

(10) Patent No.: US 8,598,756 B2
(45) Date of Patent: Dec. 3, 2013

(54) ELECTRIC-MOTOR AUXILIARY DRIVE FOR VEHICLES, AND METHOD FOR PRODUCING AND MOUNTING A DRIVE OF THIS TYPE

(75) Inventor: Siegfried Stefani, Oberriexingen (DE)

(73) Assignee: Valeo Systemes D'Essuyage, La Verriere (FR)

( * ) Notice: Subject to any disclaimer, the term of this patent is extended or adjusted under 35 U.S.C. 154(b) by 508 days.

(21) Appl. No.: 12/740,370

(22) PCT Filed: Oct. 10, 2008

(86) PCT No.: PCT/EP2008/008559
§ 371 (c)(1),
(2), (4) Date: Jul. 29, 2010

(87) PCT Pub. No.: WO2009/056211
PCT Pub. Date: May 7, 2009

(65) Prior Publication Data
US 2010/0293736 A1 Nov. 25, 2010

(30) Foreign Application Priority Data
Oct. 30, 2007 (DE) .................. 10 2007 052 057

(51) Int. Cl.
*H02K 5/16* (2006.01)
*H02K 7/08* (2006.01)
(52) U.S. Cl.
USPC ............... 310/90; 310/83; 310/98; 310/99
(58) Field of Classification Search
USPC ........................ 310/90, 83, 98, 99
See application file for complete search history.

(56) References Cited

U.S. PATENT DOCUMENTS

| | | | | |
|---|---|---|---|---|
| 3,619,086 A * | 11/1971 | Johnson et al. | ............... | 417/360 |
| 4,829,195 A * | 5/1989 | Takami | ............... | 290/48 |
| 4,868,407 A * | 9/1989 | Isozumi et al. | ............... | 290/48 |
| 5,620,311 A * | 4/1997 | Wetzel | ............... | 417/415 |
| 5,977,673 A * | 11/1999 | Iwata | ............... | 310/90 |
| 6,700,269 B2 * | 3/2004 | Torii et al. | ............... | 310/154.08 |
| 6,900,564 B2 * | 5/2005 | Kobayashi et al. | ............... | 310/83 |
| 2002/0121401 A1 * | 9/2002 | Shimizu et al. | ............... | 180/444 |
| 2002/0190591 A1 | 12/2002 | Nishimura | | |
| 2004/0075353 A1 * | 4/2004 | Walther et al. | ............... | 310/90 |
| 2005/0012421 A1 * | 1/2005 | Fukuda et al. | ............... | 310/179 |
| 2007/0138885 A1 * | 6/2007 | Fleischer et al. | ............... | 310/77 |
| 2007/0205680 A1 * | 9/2007 | Miyoshi et al. | ............... | 310/90 |

FOREIGN PATENT DOCUMENTS

| | | |
|---|---|---|
| DE | 43 17 622 A1 | 12/1994 |
| EP | 0 798 843 A1 | 10/1997 |
| JP | 2007195400 A * | 8/2007 |

OTHER PUBLICATIONS

International Search Report w/translation from PCT/EP2008/008559 dated Apr. 23, 2009 (4 pages).

* cited by examiner

*Primary Examiner* — Tran Nguyen
*Assistant Examiner* — Alex W Mok
(74) *Attorney, Agent, or Firm* — Osha Liang LLP

(57) ABSTRACT

Electric-motor auxiliary drive for vehicles, in particular screen-wiper drive, having an electric motor and a gear mechanism, having at least two housing elements which are connected to one another and having a shaft which is mounted in a first housing element by way of at least one first bearing and in a second housing element by way of at least one second and one third bearing.

23 Claims, 4 Drawing Sheets

ELECTRIC-MOTOR AUXILIARY DRIVE FOR VEHICLES, AND METHOD FOR PRODUCING AND MOUNTING A DRIVE OF THIS TYPE

BACKGROUND OF THE INVENTION

The invention refers to an electric-motor auxiliary drive for vehicles, and methods for producing and mounting the same.

Electric-motor auxiliary drives for vehicles, especially also for private cars or road vehicles of this kind, are known in various different embodiments and consist for example of an electric motor etc. with a motor or armature shaft and of a downstream gear mechanism. The armature shaft generally extends in this case into the gear mechanism where it forms a worm gear for example interacting with a worm wheel of the gear mechanism. Embodiments are also known in particular in which the armature shaft is mounted with a total of three bearings which respectively achieve a radial support and to be more precise with two bearings of this type for example in a gear housing and with a bearing in a housing of the electric motor. In auxiliary drives of this type, it is necessary in this case that the bearings achieving the radial support of the armature be in true alignment, i.e. arranged exactly in the same axis in relation to one another, since any deviation from this (hereinafter known as "alignment error") during operation will result in constantly changing deflection of the armature shaft with the risk of premature shaft breakage.

BRIEF SUMMARY OF INVENTION

The purpose of the invention is to demonstrate an electric-motor auxiliary drive which, with a simplified construction, among other aspects allows an arrangement of the bearings radially supporting the shaft of the auxiliary drive that is as free of alignment errors as possible and also makes it possible to monitor production and/or mounting for possible alignment errors of the bearings.

Further developments, advantages and application possibilities of the invention are also apparent from the following description of examples of embodiment and from the figures. In this case, all the characteristics described and/or illustrated are in themselves or in any desired combination fundamentally a subject of the invention, regardless of their summary in the claims or their backward relation. The contents of the claims are also made an integral part of the description.

The invention is described below in further detail in examples of embodiment based on the figures.

DETAILED DESCRIPTION OF INVENTION

Figure 1:
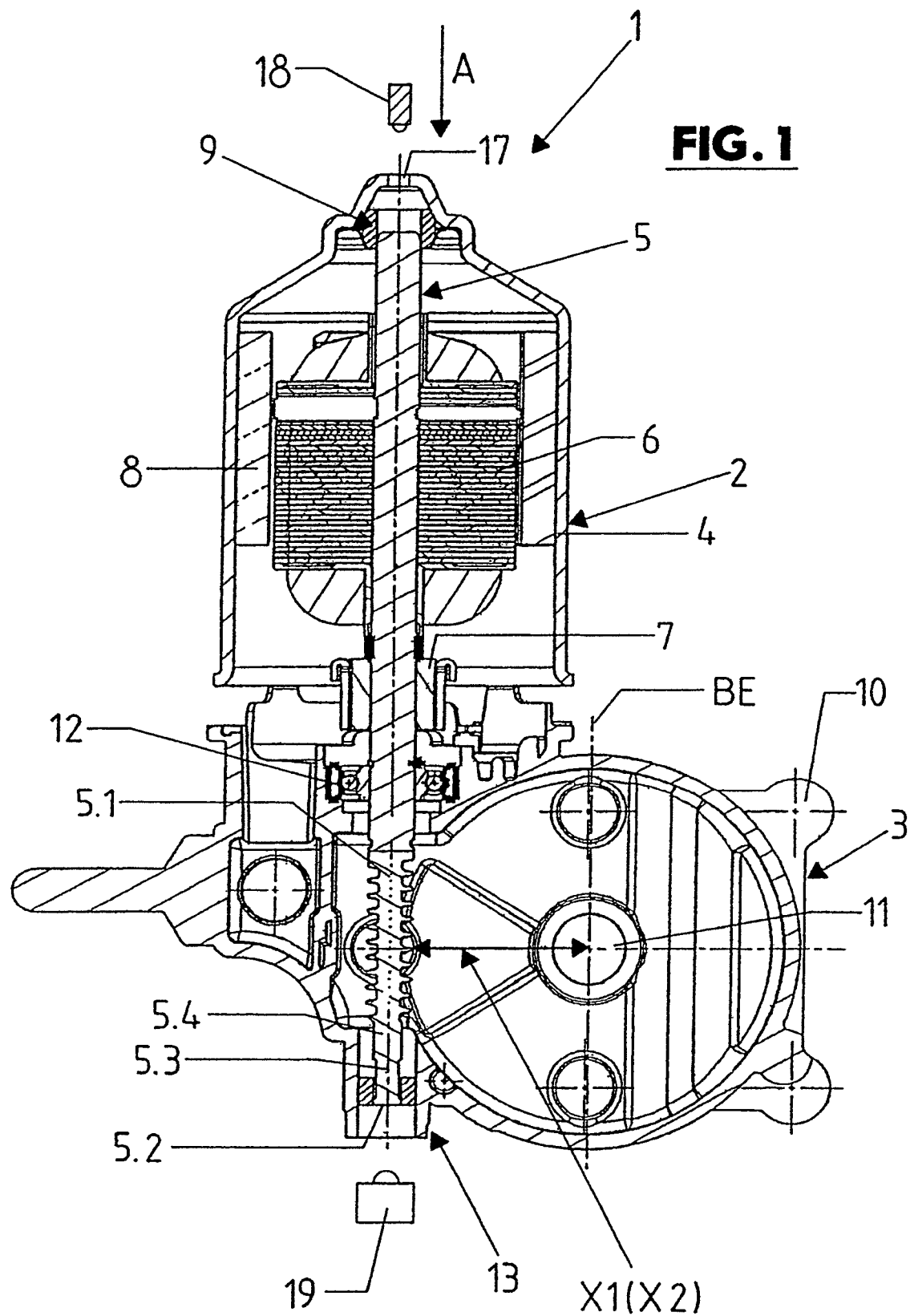
FIG. 1 shows a simplified cross-sectional view of an electric-motor auxiliary drive for vehicles in the form of a screen-wiper drive essentially consisting of an electric motor with a motor and armature shaft in addition to a gear mechanism and to be more precise, before the connection and flanging of the electric motor on the gear mechanism.
Figure 2:
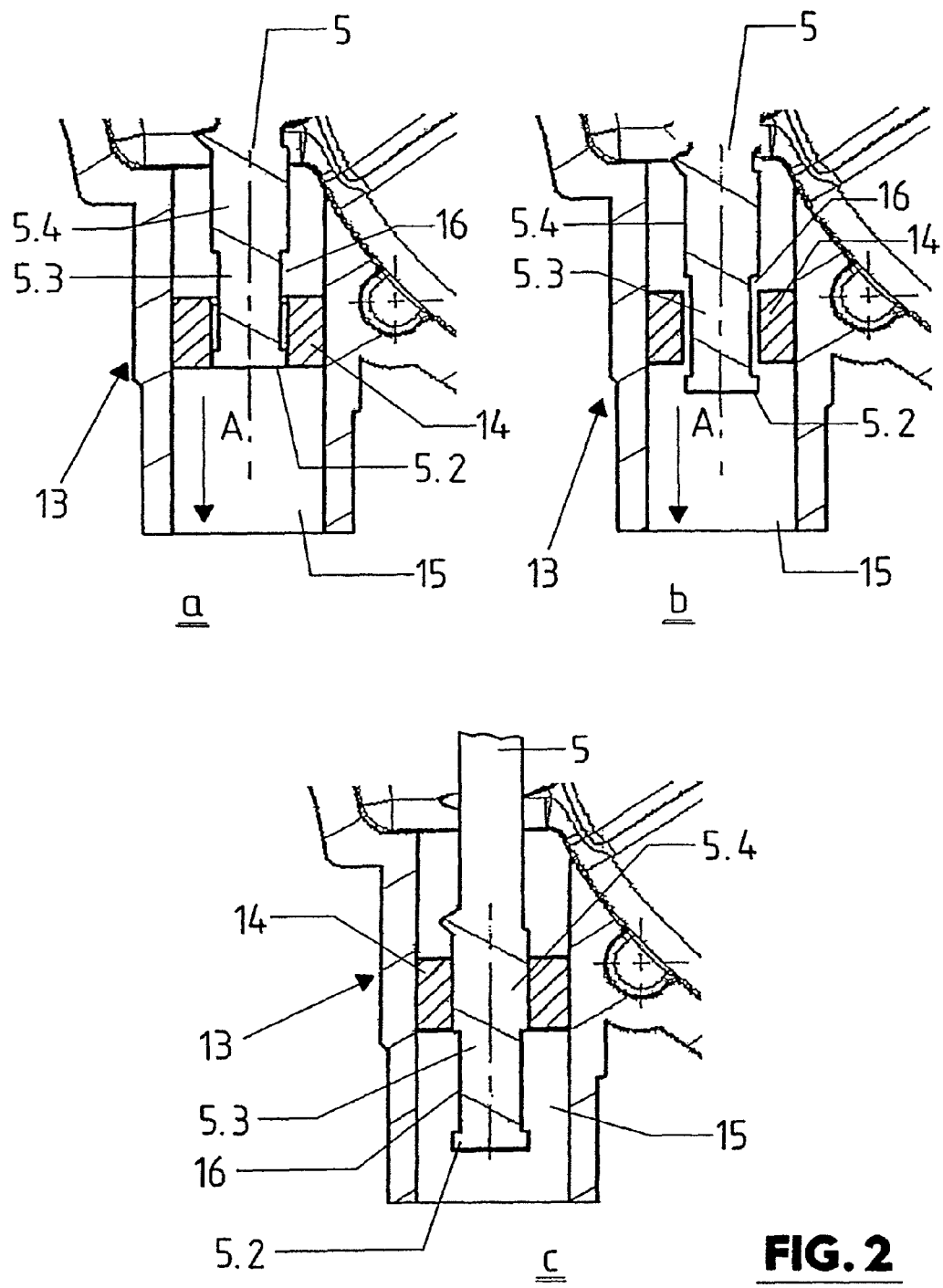
FIG. 2 shows in positions a)-c) in an enlarged partial representation respectively a sliding bearing of the armature shaft of the auxiliary drive in FIG. 1 constructed in a gear housing in various different states.

In FIGS. 1 and 2, 1 is an electric-motor auxiliary drive for vehicles, particularly for private cars or road vehicles of this kind, in the form of a screen-wiper drive essentially consisting of an electric motor 2 and of a gear mechanism 3 constructed of a worm gear 3.

The electric motor 2 comprises among other aspects a pot-like motor housing 4 (motor pot), a motor or armature shaft 5, an armature 6 provided on the armature shaft 5, essentially consisting of a stack of metal sheets and an armature winding, a commutator 7 likewise provided on the armature shaft, in addition to a stator 8, which in the embodiment presented is formed of permanent magnets and is provided on the inside of the housing 4. One end of the armature shaft 5 is rotatably mounted by way of a first bearing 9 constructed as a sliding or spherical bearing on the closed side of the pot-like motor housing 4.

With the drive 1 installed, the armature shaft 5 with the commutator 7 and with a sublength subsequent to the commutator 7 extends into the inside of a gear housing 10 of the gear mechanism 3 and is provided at this position with a worm-shaped section 5.1, which with the auxiliary drive 1 completely mounted, interacts with a gearwheel or worm wheel not represented in FIG. 1, which is arranged on an output shaft likewise not illustrated of the auxiliary drive 1 and is rotatably mounted with this shaft in a bearing 11 in the gear housing 10, as is familiar to the person skilled in the art.

In the gear housing 10, the armature shaft 5 is mounted between the section 5.1 and the commutator 7 by way of a second bearing 12 constructed as a ball bearing in the embodiment presented. At its second end distant from the motor housing 4, the armature shaft 5 is finally mounted in a third bearing 13 constructed as a sliding bearing in the embodiment presented.

This third bearing 13 is represented in detail in FIG. 2. It essentially consists of a ring-like bearing bush 14, which in the same manner as the bearing bush of the bearing 9, is manufactured from a material suitable for a bearing of this type, e.g. from a metallic material (including sintered material) and is accommodated in a sleeve-like, housing section 15 of the gear housing open to the outer side of the gear housing 10.

The armature shaft is constructed in the area of the bearing 13 and the bearing bush 14 at this position with a cross-sectional constriction 16 (recess or annular groove), such that in the area of this cross-sectional constriction, three armature shaft sections 5.2-5.4 result and to be more precise, starting from the free end of the armature shaft 5, the section 5.2 with a circular cylindrical-shaped external diameter, which is equal to the internal diameter of the circular cylindrical-shaped bearing opening of the bearing bush 14, subsequently the section 5.3 with a reduced external diameter in relation to the bearing opening of the bearing bush 14 and subsequently the section 5.4 with a circular cylindrical-shaped external diameter which is in turn equal to the internal diameter of the bearing opening of the bearing bush 14. In the embodiment presented, the sections 5.2 and 5.4 possess the same external diameter; the section 5.2 is only constructed with a very short axial length. The axial length of the section 5.3 is at least equal to, i.e. in the embodiment presented somewhat larger than, the axial length that the bearing bush 14 presents in the axial direction of the armature shaft 5.

Installation of the electric-motor auxiliary drive 1 is performed such that the armature shaft 5 with the armature 6, commutator 7 and bearing 12 are initially mounted on the gear housing 10 in such a manner that the bearing 12 is received in the bearing receptacle provided for this bearing on the gear housing 10 and the armature shaft section 5.2 is received in the bearing bush 14 preinstalled in the gear housing 10; the armature shaft 5 is among other aspects radially supported in the gear housing 10 in two areas spatially separated from one another, that is to say on the bearing 12 and on the bearing 13 and on the shaft section 5.1 engaging in the bearing bush 14, thereby presenting a predetermined orientation with reference to the gear housing 10. Subsequently, the motor housing 4 with the components preinstalled in this housing is mounted on the armature shaft 5 such that the latter is received in the bearing 9. By means of axial displacement in relation to the armature shaft 5, the motor housing 4 is approached with its open side to the gear housing 10 and is joined to the gear housing 10 in a suitable manner, for instance by screw fitting, with also particularly owing to the construction of the bearing 9 as a spherical bearing, alignment of the motor housing 4 in relation to the armature shaft 5 being possible.

In order to detect any possible alignment errors of the three bearings 9, 12 and 13, in this initial state of the bearing 13 (position a) in FIG. 2), in which the armature shaft 5 is radially supported in the bearing 13 by way of the shaft section 5.2, the position of the armature shaft 5, for example the position of the section 5.1 received in the still open gear housing, is recorded in an initial measurement using a suitable measuring device and to be more precise, with reference to a suitable reference point or a suitable reference plane, as implied in a simplified manner in FIG. 1 by the reference plane BE and the distance x1. The reference plane BE in this case is for example a plane oriented parallel to the axis of the armature shaft 5 and which furthermore includes the axis of the bearing 11.

Following the initial measurement, axial displacement of the armature shaft 5 is performed in the direction of the arrow A in FIG. 1 using a suitable tool, for example a mandrel, which acts through an opening 17 with axial compressive force on the end of the armature shaft 5 mounted in the motor housing 4, so that after this axial displacement, the cross-sectional constriction 16 and the shaft section 5.3 formed by this constriction is received in the bearing bush 14 and consequently the end of the armature shaft 5 in question is no longer radially supported by the bearing 13 (position b) in FIG. 2). A second measurement of the distance x2 from the reference plane BE subsequently follows. Both measurements are compared. If the distances x1 and x2 measured during these measurements are different, this means that the armature shaft 5 no longer radially supported by the bearing 13 during the second measurement has deflected owing to an alignment error of the bearings 9, 12 and 13. The magnitude of the alignment error can be determined from the difference in the distances x1 and x2. If the alignment error is outside the permitted tolerance range, further mounting of the auxiliary drive 1 is discontinued for example and this drive and its components are submitted for reworking. If the alignment error lies within the permitted tolerance range, further axial displacement of the armature shaft 5 in the direction of the arrow A is performed during a further installation stage, for example again using the mandrel acting axially on the armature shaft 5 through the opening 17, such that the shaft section 5.4 is received in the bearing bush 14 (position c) in FIG. 2) and therefore the armature shaft 5 is mounted radially supported in all three bearings 9, 12 and 13. By means of the opening 17 and by means of the open end of the housing section 15, the necessary axial support of the armature 5 is subsequently provided by inserting and mounting bearing elements 18 and 19 that act as axial supporting bearings.

As described above, the bearing 13 can therefore adopt three different states in only a single direction (arrow A) as a result of axial displacement of the armature shaft 5, that is to say, a first state, shown in position a) in FIG. 2 in which the armature shaft section 5.2 is received in the bearing bush 14 and is radially supported and in which the armature shaft 5 is arranged in the gear housing with a fixed orientation by way of the two bearings 12 and 13 for mounting aligned in relation to the motor housing 4, a second state shown in position b) in FIG. 2 and in which the shaft section 5.3 is received in the bearing bush 14 and therefore a radial support of the armature shaft 5 now mounted in the bearings 9 and 12 is lacking, in addition to a third state, shown in position c) in FIG. 2 and in which the armature shaft mounted in the bearings 9 and 12 by way of its shaft section 5.4 is also mounted radially supported in the bearing 13 and which corresponds to the final installation state of the triple mounting of the armature shaft 5.

Fundamentally, the electric-motor auxiliary drive 1 may also be designed such that the second state of the bearing 13 (position b) in FIG. 2), in which the shaft section 5.3 is received in the bearing bush 14, already forms the final state and ultimate installation state and therefore the bearing 13 acts in this case in conjunction with the bearing section 19 inserted in the housing section as a mere axial supporting bearing or axial bearing.

Figure 3:
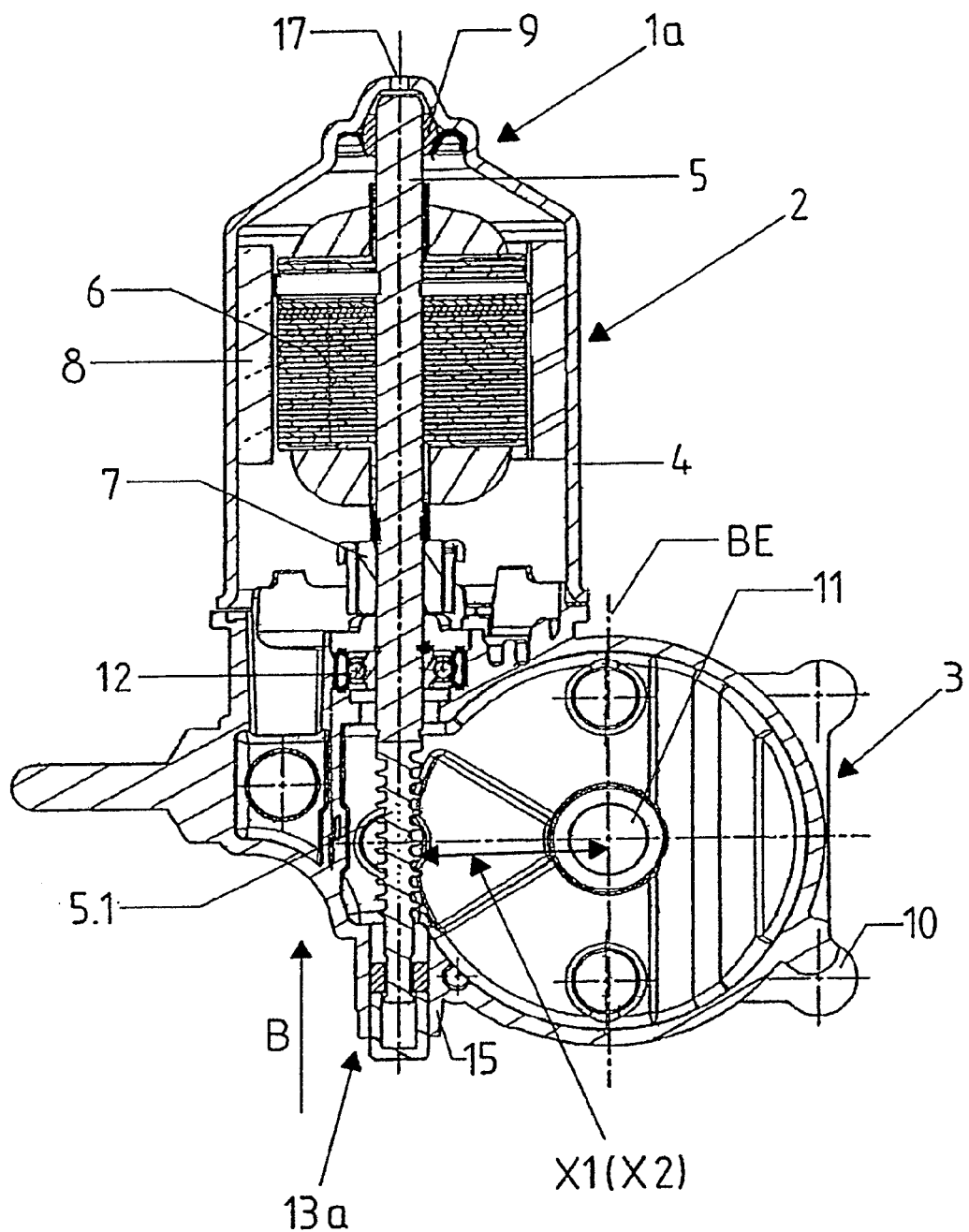
FIG. 3 shows a representation as in FIG. 1 with a further embodiment of an electric-motor auxiliary drive in the form of a screen-wiper drive of the invention.
Figure 4:
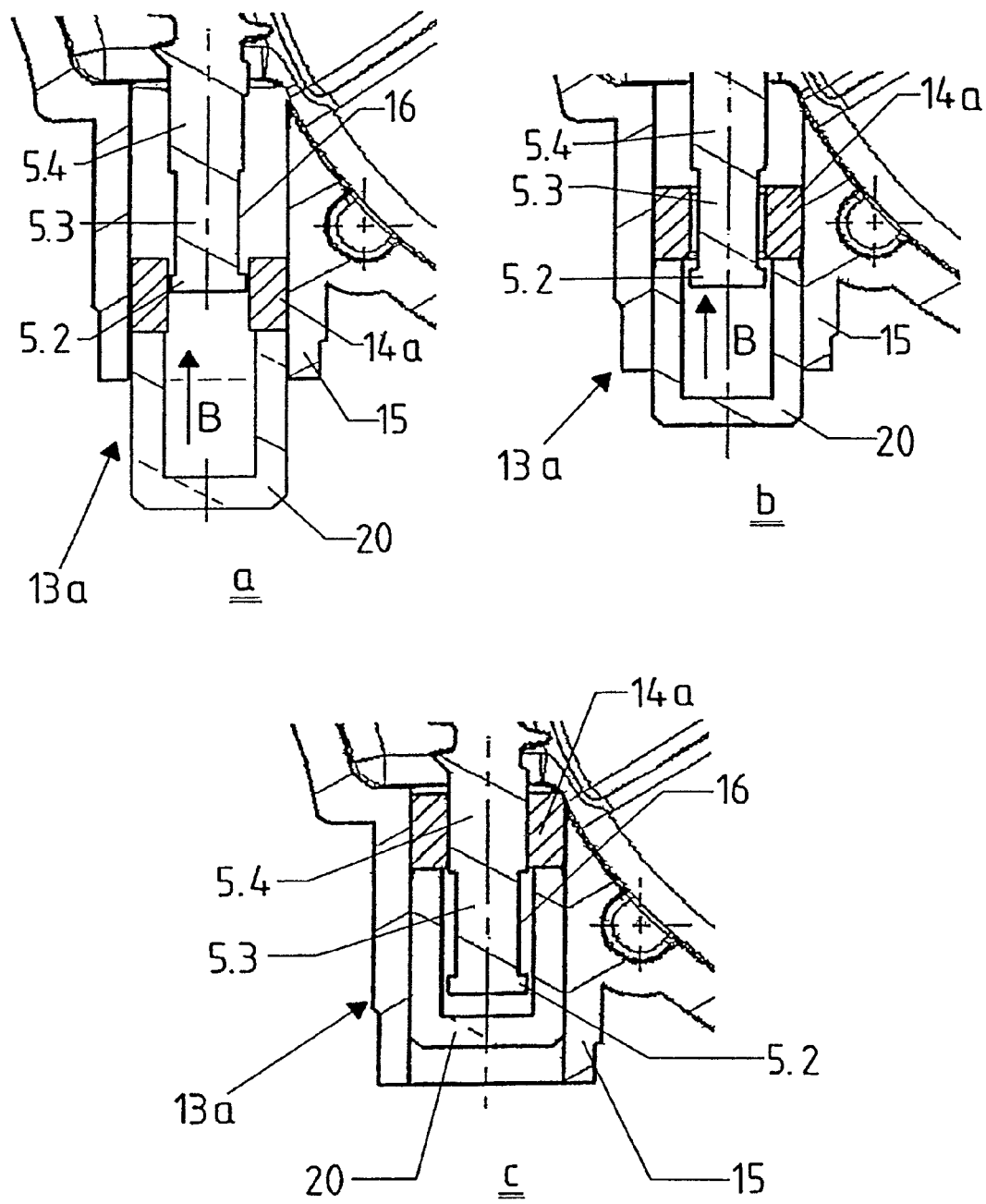
FIG. 4 shows in positions shows in positions a)-c) in an enlarged partial representation respectively a sliding bearing of the armature shaft of the auxiliary drive in FIG. 3 constructed in a gear housing in various different states.

FIGS. 3 and 4 show in illustrations as in FIGS. 1 and 2 an electric-motor auxiliary drive 1a as a further embodiment, which only differs from the auxiliary drive 1 in that in the gear housing 10 and in the housing section 15, a bearing 13a is provided as the third bearing for the armature shaft 5 instead of the bearing 13. The bearing 13a essentially consists in this case of the bearing bush 14a corresponding to the bearing bush 14 and in addition of a cap 20 inserted at least in the final installation state into the sleeve-like housing section 15 and serving among other aspects for sealing the gear housing 10 on the housing section 15 and likewise also as an axial supporting bearing.

The armature shaft 5 is again provided with three shaft sections 5.2, 5.3 and 5.4 on its end interacting with the bearing bush 14a and therefore the bearing 13a may likewise present the three states, to be more precise the first state in which the section 5.2 is received in the opening of the bearing bush 14a (position a) in FIG. 4) and as a result of which the armature shaft 5 radially supported by the two bearings 12 and 13a presents a predetermined orientation in the gear housing 10. In this state, after axial push-fitting of the motor housing 4 with the bearing 9 on to the armature shaft 5, connection of the motor housing 4 to the gear housing 10 is performed with simultaneous tolerance compensation for arrangement of all the bearings 9, 12 and 13a in as far as possible in the same axis. Owing to the construction of the bearing 9 as a spherical bearing, alignment of the position of the axis of the motor housing 5 in relation to the position of the armature shaft 5 within a permitted tolerance range is again possible.

With the gear housing 10 open and the gearwheel or worm wheel not yet installed, the distance x1 is determined during a first measurement in the initial state of the bearing 13a. Subsequently, the bearing 13a is transferred to the second state and to be more precise by displacing the bearing bush 14 using a suitable tool, for example also by using the cap 20, axially into the inside of the gear housing 10 until the section 5.3 of the armature shaft 8 is received in the bearing bush 14a, i.e. radial support of the armature shaft 5 is no longer provided by way of the bearing 13a and exclusively by way of the bearings 9 and 12. In this second state, the distance x2 is measured. Based on the difference between the distances x1 and x2, it may again be concluded whether an alignment error in the bearings 9, 12 and 13a is present and whether this possibly exceeds a predetermined tolerance range. If this is the case, further mounting of the auxiliary drive 1 is discontinued for example and the drive and its components are submitted for reworking. If no alignment error is detected or the latter lies within a permitted tolerance range, transfer of the bearing 13a to the third, final installation state is performed by further axial displacement of the bearing bush 14a in the direction of the arrow B, for example again by means of the cap 20, in which the section 5.4 of the armature shaft 5 is received in the bearing bush 14a and the armature shaft 5 is therefore mounted radially supported in the three bearings 9, 12 and 13a.

With a corresponding construction, the bearing 12 or however an axial supporting bearing in the area of the bearing 9 corresponding to the bearing element 18 in addition to the cap 20 designed as an axial supporting bearing serves for axial support.

The invention has been described above based on examples of embodiment. Common to these is the fact that as a result of axial displacement of the armature shaft 5 or the bearing bush 14a in only one axial direction respectively, the three states for the bearing 13 and 13a are attainable. As a result, the change in state for the bearing 13 and 13a is possible with little effort, particularly also with little expenditure in terms of tools during mounting of the auxiliary drive 1 and 1a. Furthermore common to the embodiment described is the fact that the change in state of the third bearing 13 and 13a is achieved by displacement of the armature shaft 5 and the bearing bush 14a respectively from the outside of the motor housing 4 and the gear housing 10 in the direction of the inside of the housing and this displacement can therefore be performed from the outside of the motor housing 3 or the gear housing 10 using a relatively simple tool.

Common to the auxiliary drives 1 and 1a is furthermore the fact that once the third bearing 13 and 13a forms a radial bearing in the final state, i.e. in the third state, the entire axial length of the bearing bush 14 and 14a forms the bearing surface interacting with the shaft section 5.4.

It was assumed above for the sake of simple explanation that the measurements of the distances x1 and x2 are only performed in one axial direction respectively. Preferably however, these distance measurements are performed respectively in at least two axial directions running vertically to one another and radially to the axis of the armature shaft 5. The measurements are performed in this case for example during mounting of each auxiliary drive 1 or 1a or however only on a random sample basis, in order for example to detect in good time tolerances creeping into production and be able to apply corresponding countermeasures.

The invention has been described above based on examples of embodiment. It is understood that many modifications and variations are possible without departing as a result from the inventive concept on which the invention is based.

LIST OF REFERENCE NUMERALS 1, 1a electric-motor auxiliary drive
2 electric motor
3 gear mechanism
4 motor housing
5 motor shaft or armature shaft
5.1-5.4 armature shaft section
6 armature
7 commutator
8 stator
9 bearing
10 gear housing
10.1 gear housing section
11 bearing for output shaft of gear mechanism
12 second bearing of the armature shaft
13, 13a third bearing of the armature shaft
14, 14a bearing bush
15 housing section
16 cross-sectional constriction in the armature shaft 5
17 opening in the motor housing 4
18, 19 bearing section for axial support
20 cap
A axial movement of the armature shaft 5 in relation to the change in state of the third bearing 13
B axial movement of the bearing bush 14a in relation to the change in state of the third bearing 13a
BE reference plane
x1, x2 distance

The invention claimed is:

1. An electric-motor auxiliary drive for vehicles, comprising:
an electric motor;
and a drive mechanism, comprising at least two interconnected housing elements and a shaft mounted in a first housing element by way of at least one first bearing and in a second housing element by way of at least one second bearing and a third bearing,
wherein axial displacement of the shaft results in a change in state of the third bearing at least between an initial state in which the third bearing is effective as a radial support for the shaft and a second state in which the third bearing is not effective as radial support for the shaft, and
wherein the electric-motor auxiliary drive is a screen-wiper drive.

2. The auxiliary drive according to claim 1, wherein, for the third bearing, by axial displacement of the shaft in one and the same direction, a dual change in state occurs, from a first state to the second state and from the second state into a third state in which the third bearing is in turn effective as radial support for the shaft.

3. The auxiliary drive according to claim 2, wherein the shaft on the third bearing and a bearing bush at this position is constructed in the area of its surfaces facing each other in such a manner that at least in the first and third states of the third bearing, the shaft is in contact with radial support against at least one bearing surface of the bearing bush, and in the second state of the third bearing, the shaft presents a radial distance from the bearing surfaces of the bearing bush.

4. The auxiliary drive according to claim 1, wherein the third bearing is formed of a bearing bush interacting with the shaft, and wherein the shaft is displaceable axially in relation to the bearing bush for the change in state of the third bearing.

5. The auxiliary drive according to claim 4, wherein the shaft, in the area of the third bearing, presents at least two axially adjacent sections of different diameters the at least two axially adjacent sections comprising:
in the first state of the third bearing, a first shaft section received in the bearing bush effects the radial support of the shaft; and
in the second state of the third bearing, a second shaft section of a reduced diameter is received in the bearing bush without radial support of the shaft.

6. The auxiliary drive according to claim 4, wherein the shaft in the area of the third bearing presents at least three axially adjacent sections of different diameter, such that in the first state of the third bearing, a first shaft section received in the bearing bush effects the radial support of the shaft, in the second state of the third bearing, a second shaft section of reduced diameter is received in the bearing bush without radial support of the shaft, and in the third state of the third bearing, a third shaft section received in the bearing bush effects the radial support of the shaft.

7. The auxiliary drive according to claim 6, wherein the first shaft section presents a curtailed axial length in comparison to the second and third shaft sections.

8. The auxiliary drive according to claim 6, wherein the second and third shaft sections are formed of a ring-like projection of the shaft.

9. The auxiliary drive according to claim 6, wherein the first and third shaft sections, respectively, of the circumferential surface of the shaft and the second shaft section are formed of a cross-sectional constriction.

10. The auxiliary drive according to claim 4, wherein the bearing bush of the third bearing forms at least two sections axially adjacent to one another, the at least two sections comprising a first section, which in the first state of the third bearing receives the shaft with axial support, and a second section, which in the second state of the third bearing, receives the shaft at a radial distance and therefore without radial support.

11. The auxiliary drive according to claim 1, wherein the first and third bearings are provided on the end of the shaft.

12. The auxiliary drive according to claim 1, wherein the first housing element is a motor housing of the electric motor and the second housing element is a gear housing of the gear mechanism.

13. The auxiliary drive according to claim 12, wherein the shaft is an armature shaft extending into the gear housing.

14. The auxiliary drive according to claim 1, wherein the first housing element is a gear housing of the gear mechanism and the second housing element is a motor housing of the electric motor.

15. The auxiliary drive according to claim 1, wherein the first and second bearing effect a radial support of the shaft.

16. The auxiliary drive according to claim 1, wherein the first and third bearings are designed as a sliding bearing.

17. The auxiliary drive according to claim 1, wherein the second bearing is designed as a ball bearing.

18. The auxiliary drive according to claim 1, comprising bearing sections for axial support of the shaft.

19. An electric-motor auxiliary drive for vehicles, comprising:
an electric motor and a gear mechanism, comprising at least two interconnected housing elements and a shaft, which is mounted in a first housing element by way of at least one first bearing and in a second housing element by way of at least one second bearing and one third bearing,
wherein the third bearing is formed of a bearing bush interacting with the shaft, and wherein, for the third bearing, at least a dual change in state by axial displacement of the bearing bush in relation to the shaft occurs, between a first state in which the first bearing is effective as radial support for the shaft, a second state in which the third bearing is not effective as radial support for the shaft, and a third state in which the third bearing is in turn effective as radial support for the shaft.

20. The auxiliary drive according to claim 19, wherein the state of the third bearing is modifiable by axial action on the shaft or on the bearing bush from the outside of one of the first housing element or the second housing element.

21. A method for producing or mounting an electric-motor auxiliary drive, comprising an electric motor and a drive mechanism comprising at least two interconnected housing elements and a shaft mounted in a first housing element by way of at least one first bearing and in a second housing element by way of at least one second bearing and a third bearing, wherein axial displacement of the shaft results in a change in state of the third bearing at least between a first state in which the third bearing is effective as a radial support for the shaft and a second state in which the third bearing is not effective as radial support for the shaft, the method comprising:
arranging the shaft in the first state with the second bearing and the third bearing in the second housing element;
connecting the first housing element guided with the first bearing on the shaft to the second housing element; and
bringing the third bearing constructed as an axial supporting bearing, by axial displacement of the shaft, into the second state.

22. The method of claim 21, further comprising:
arranging the shaft with the second bearing and the third bearing, in the first state, in the second housing element;
connecting the first housing element guided with the first bearing on the shaft to the second housing element;
measuring a position of the shaft in order to generate a first measurement value;
bringing the third bearing is brought into the second state not radially supporting the shaft, wherein the position of the shaft is measured in order to generate at least one second measurement value; and
establishing an alignment error of the bearing by taking account of the first and second measurement value.

23. The method according to claim 22, wherein the mounting of the auxiliary drive is continued, thereby bringing the third bearing into a third state when the alignment error has not been established or the established alignment error lies within a permitted tolerance range.

* * * * *